United States Patent [19]

Shirata et al.

[11] Patent Number: 5,067,578
[45] Date of Patent: Nov. 26, 1991

[54] TRACTION CONTROL SYSTEM FOR MOTOR VEHICLES

[75] Inventors: Akihiro Shirata, Yokohama; Hideaki Watanabe, Chigasaki; Naoyuki Hagiya, Ageo; Satomi Ookubo, Kuki; Shigeki Moride, Yokohama, all of Japan

[73] Assignees: Isuzu Motors Limited; Fujitsu Limited; Akebono Brake Industry Co., Ltd.; Akebono Research and Development Centre Ltd., Japan

[21] Appl. No.: 593,494

[22] Filed: Oct. 3, 1990

Related U.S. Application Data

[63] Continuation of Ser. No. 286,989, Dec. 20, 1988, abandoned.

[30] Foreign Application Priority Data

Dec. 28, 1987 [JP] Japan .................... 62-329670

[51] Int. Cl.[5] .............................. B60K 31/00
[52] U.S. Cl. ..................... 180/197; 123/352; 74/860
[58] Field of Search .................. 180/197, 244; 364/426.03; 123/352, 360, 361; 74/857, 859, 860, 844, 872

[56] References Cited

U.S. PATENT DOCUMENTS

| | | | |
|---|---|---|---|
| 4,290,323 | 9/1981 | Gospodar | 74/872 |
| 4,620,420 | 11/1986 | Gloss et al. | 74/860 |
| 4,722,411 | 2/1988 | Ohashi et al. | 180/197 |
| 4,736,814 | 4/1988 | Yogo et al. | 364/426.03 |

Primary Examiner—Andres Kashnikow
Assistant Examiner—Richard Camby

[57] ABSTRACT

In a traction control system for motor vehicles, a lower limit for throttle opening degree command with respect to each gear position of transmission is set up, and when the transmission is shifted up, the throttle opening degree command is decreased down to the lower limit for throttle opening degree command corresponding to the gear position assumed through the shift-up operation.

7 Claims, 4 Drawing Sheets

TRACTION CONTROL SYSTEM FOR MOTOR VEHICLES

This application is a continuation of application Ser. No. 07/286,989, filed Dec. 20, 1988, now abandoned.

BACKGROUND OF THE INVENTION

1. Field of the Invention

This invention relates to a wheel slip control system for motor vehicles, and more particularly it pertains to a system for controlling the throttle valve of the motor vehicle when the speed change gear is actuated.

2. Description of the Prior Art

There have heretofore been proposed a so-called traction control system for preventing driving wheel slip which tends to occur when the motor vehicle starts running or accelerating while running on a road surface having a low friction coefficient such as, for example, frozen, snow-covered or muddy road surface, thereby improving the starting/accelerating performance and running stability of the motor vehicle, as disclosed, for example, in U.S. Pat. No. 4,722,411 and U.S. Pat. No. 4,736,814.

Referring to FIG. 1 of the drawings, there is shown a timing chart useful for explaining the operation of such a conventional system as referred to just above on the basis of the relationship between driving wheel speed Vd and throttle opening degree command, wherein traction control is effected from time $P_1$ when the driving wheel speed Vd exceeds a throttle control starting threshold Vs which is set up by adding a predetermined amount to non-driving wheel speed Vn. More specifically, at the time $P_1$, throttle closing command is provided to drive a DC motor so that the throttle is closed with a predetermined closing rate and engine output is reduced accordingly. At time $P_2$, the driving wheel speed Vd is changed from increasing to decreasing as a result of the reduction of the engine output, and thereupon throttle opening command is provided to drive the DC motor so that the throttle is opened with a predetermined rate and the engine output is increased accordingly. In this way, it is possible to prevent driving wheel slip which tends to occur when the motor vehicle starts running or acceleration, by controlling the throttle opening degree. At time $P_3$, shift-up operation of manual transmission is started so that the throttle opening command is cancelled and thus the throttle opening degree command which was prevailing before the gear changing operation, is retained as it is; and at time $P_4$, throttle opening command is provided again so that the throttle opening degree is increased from that prevailing prior to the gear changing operation.

However, the above-mentioned conventional traction control system is disadvantageous in that there is a tendency that during the period from the time $P_1$ to $P_2$, the throttle is excessively closed so that necessary driving force cannot be produced. Another disadvantage is such that during the shift-up operation, the throttle opening degree command provided at the start of the shift-up operation is retained and the actual throttle opening degree is caused to follow that throttle opening degree command to rapidly increase the engine speed so that a significant driving force is suddenly imparted to the driving wheels to the latter to slip at the end of the shift-up operation (when the clutch is engaged).

SUMMARY OF THE INVENTION

Accordingly, it is an object of the present invention to provide an improved traction control system for motor vehicles, which is designed so that a minimum necessary wheel driving force can be secured when the transmission of the motor vehicle assumes a respective gearing position, and thus driving wheel slip which tends to occur during gear changing operation, can be most effectively prevented.

Briefly stated, according to the present invention, there is provided a traction control system for motor vehicles, wherein a lower limit for throttle opening degree command with respect to each gear position of transmission is set up, and when the transmission is shifted up, the throttle opening degree command is decreased down to the lower limit for throttle opening degree command corresponding to the gear position assumed through the shift-up operation.

As will be appreciated, according to the present invention, a lower limit for throttle opening degree command is set up with respect to each gear position of transmission so that the minimum necessary driving force for each gear position of the transmission can always be produced; and when gear change is effected at the transmission, the throttle opening degree command is decreased down to the lower limit corresponding to the gear position assumed through the gear change operation so that a rapid increase in engine speed is prevented from being caused during the gear change operation and thus a sudden application of driving force to the driving wheels is avoided. In this way, it is possible to prevent driving wheel slipping.

Other objects, features and advantages of the present invention will become apparent from the ensuing description taken in conjunction with the accompanying drawings.

DESCRIPTION OF THE PREFERRED EMBODIMENTS

Figure 1:
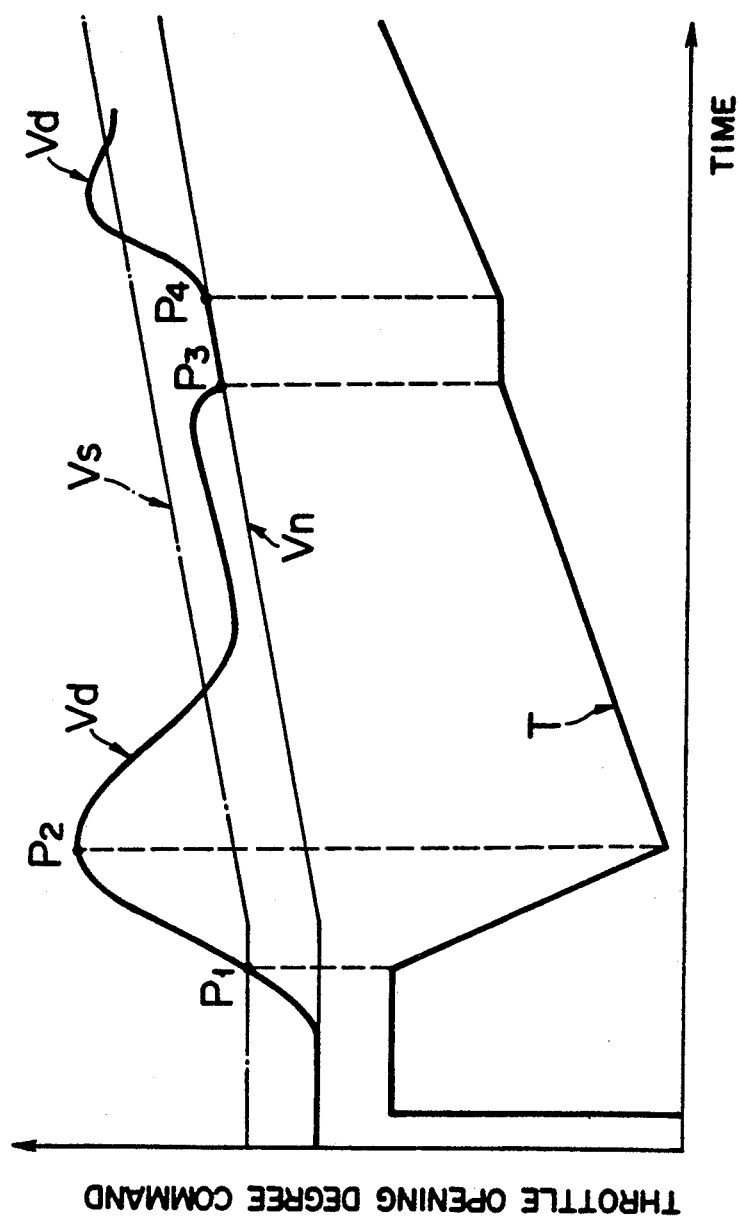
FIG. 1 is a timing chart useful for explaining a conventional throttle control system.
Figure 2:
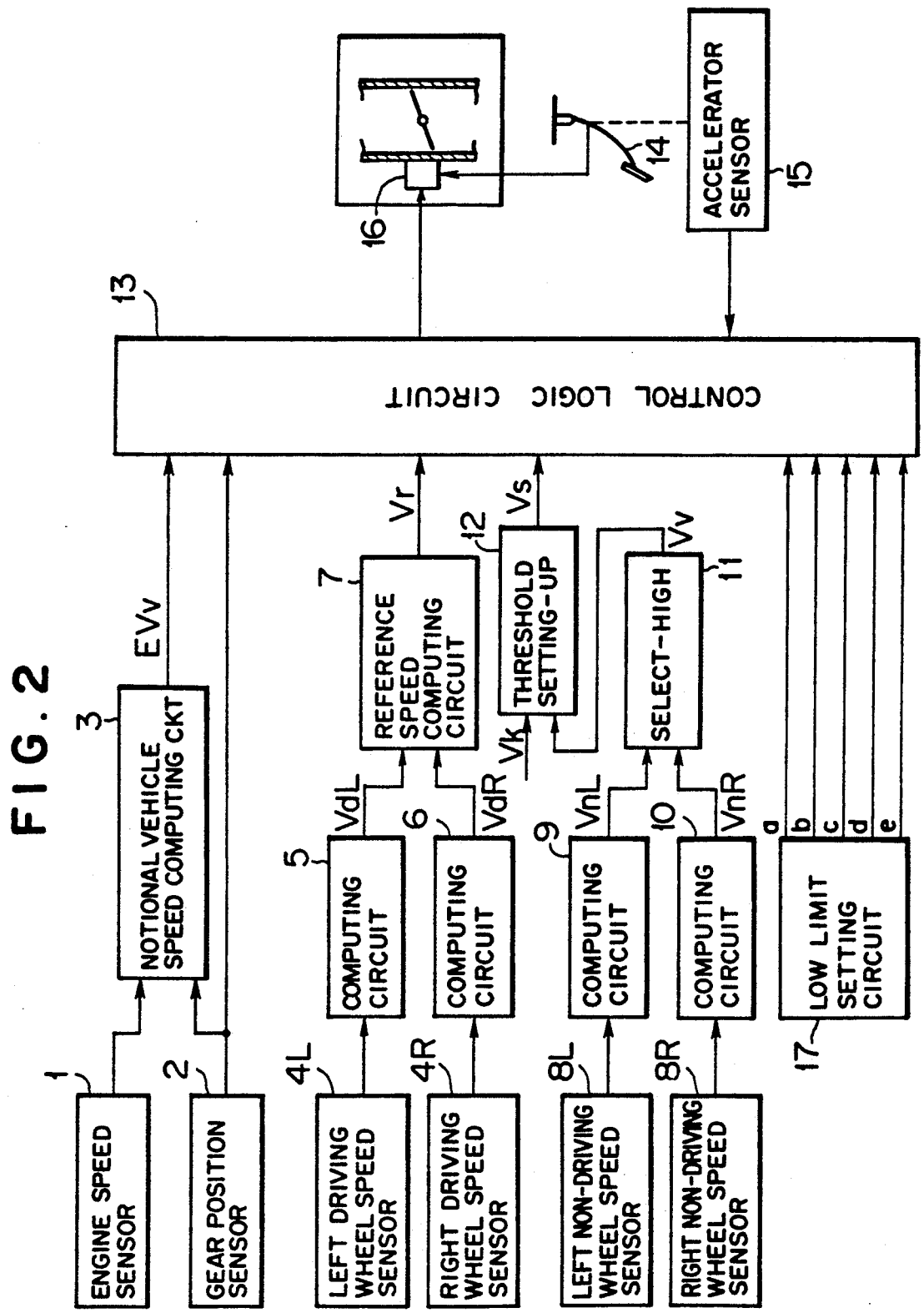
FIG. 2 is a block diagram showing the traction control system for motor vehicles according to an embodiment of the present invention.
Figure 3:
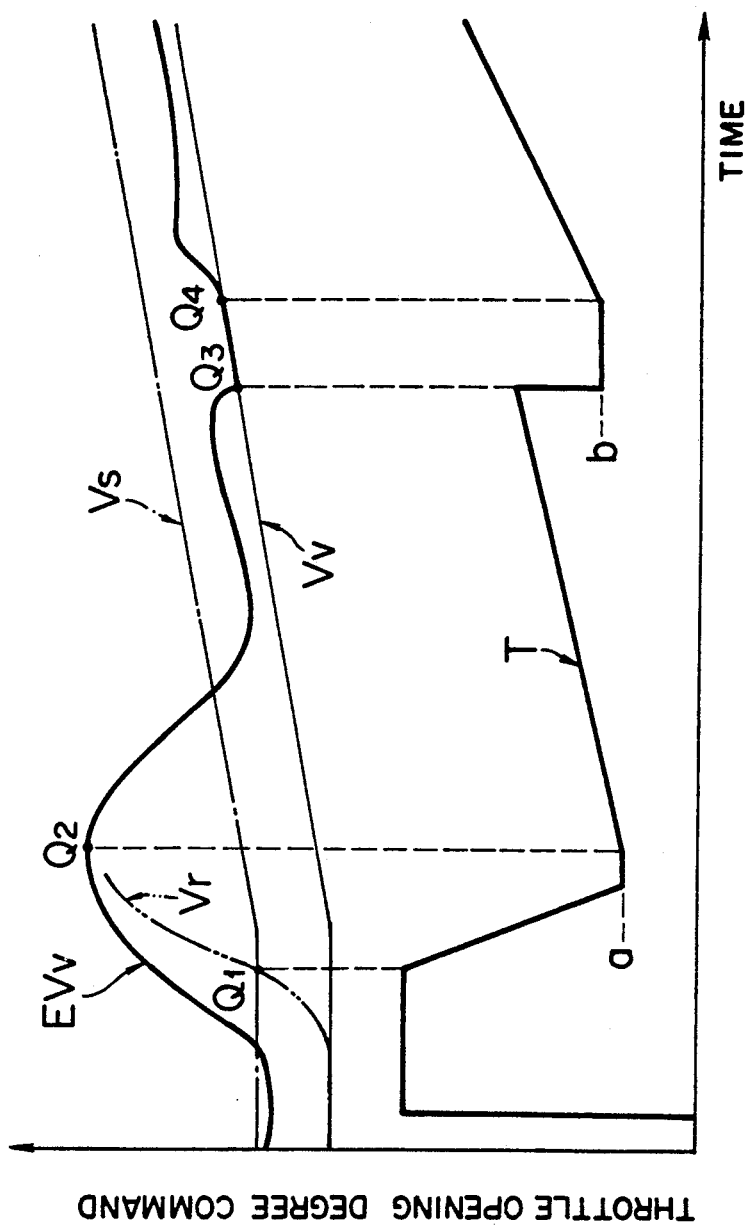
FIG. 3 is a timing chart useful for explaining throttle control effected with the system of FIG. 2.

Referring to FIG. 2, there is shown the traction control system comprising a microcomputer according to an embodiment of the present invention. FIG. 3 shows a timing chart useful for explaining the operation of the system of FIG. 2. The system shown in FIG. 2 includes an engine speed sensor 1 and gear position sensor 2 for detecting the gear position of transmission. The outputs of the sensors 1 and 2 are passed to a computing circuit 3 in which a notional vehicle speed EVv is computed on the basis of the current engine speed and gear position without taking into account clutch slip. The output of the gear position sensor 2 is also passed directly to a control logic circuit 13.

The speeds of the lefthand and righthand driving wheel are detected by wheel speed sensors 4L and 4R respectively, and the driving wheel speeds DvL and VdR are computed in computing circuits 5 and 6. The wheel speeds VdL and VdR thus computed are provided to a reference speed computing circuit 7 in which the mean value of such wheel speeds is computed as reference speed Vr (=(VdL+VdR)/2). The speeds of the lefthand and righthand non-driving wheels are detected by speed sensors 8L and 8R respectively. In computing circuits 9 and 10, non-driving wheel speeds VnL and VnR are computed respectively, which in turn are passed to a select-high circuit 11 in which the higher one of such wheel speeds is selected and computed as a computed vehicle speed Vv which is approximate to the actual vehicle speed. The computed vehicle speed Vv is provided a threshold setting-up circuit 12 in which a throttle control threshold speed Vs such as shown in FIG. 3 is set up by adding a predetermined value Vk to the computed vehicle speed Vv. The notional vehicle speed EVv, reference speed Vr, threshold speed Vs and computed vehicle speed Vv are all inputted to the control logic circuit 13; the output of a sensor 15 which detects the extent of depression of an accelerating pedal 14 is also inputted thereto; and the throttle position corresponding to the extent of depression of the accelerating pedal 14 is detected on the basis of the output of the sensor 15.

Furthermore, a throttle opening degree lower limit setting-up circuit 17 is provided which is arranged so as to provide signals representing a lower limit value a for the throttle opening degree command with respect to the first speed, a lower limit value b for the throttle opening degree command with respect to the second speed, a lower limit value c for the throttle opening degree command with respect to the third speed, a lower limit value d for the throttle opening degree command with respect to the fourth speed, and a lower limit value e for the throttle opening degree command with respect to the fifth speed (where $a<b<c<d<e$). The output of the circuit 17 is also passed to the control logic circuit 13.

The control logic circuit 13 is arranged to drive a throttle driving mechanism 16 on the basis of the abovementioned various input signals to perform throttle control, thereby controlling the engine output when the motor vehicle starts running or acceleration, or when gear change is effected during the starting or accelerating operation.

Figure 4:
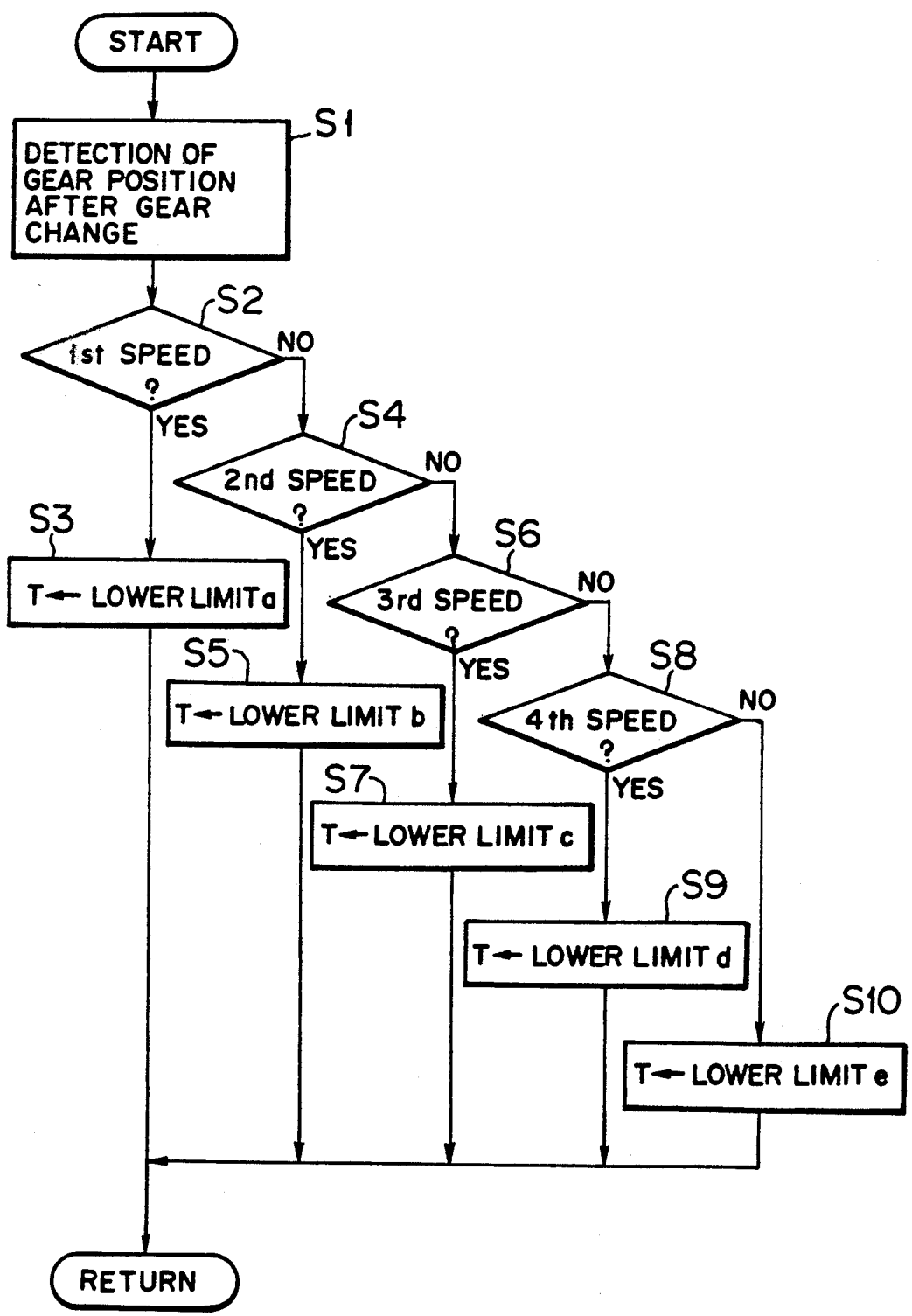
FIG. 4 is a flow chart of throttle control routine performed during gear change operation according to the embodiment of the present invention.

The traction control system according to this embodiment of the present invention will further be described with reference to FIG. 3 showing a timing chart and FIG. 4 illustrating throttle control routine.

When the motor vehicle is stopped, the transmission is shifted to the first speed gear and the accelerator pedal 14 is depressed to the maximum extent, so that the reference speed Vr (the mean value of the lefthand and righthand driving wheel speeds VdL and VdR in this example) and notional vehicle speed EVv (vehicle speed computed on the basis of the current engine speed and the gear position of the transmission without taking into account of the clutch slip) begin to increase. Traction control is started at time $Q_1$ when the following two conditions are met:

(1) The reference speed Vr exceeds the control threshold value Vs during acceleration. (In this embodiment, the control threshold value Vs is set up by adding a predetermined value Vk to the computed vehicle speed Vv determined on the basis of the higher one of the lefthand and righthand non-driving wheel speeds VnL and VnR.)

(2) The notional vehicle speed EVv exceeds the control threshold value Vs.

As a result of the traction control being started at the time $Q_1$, throttle closing command is provided so that throttle closing control is executed. After the time $Q_1$, throttle opening/closing control is effected on the basis of the notional vehicle speed EVv instead of the reference speed Vr.

By employing the notional vehicle speed EVv, it is possible to exclude slip occurring at the engine driving force transmission system from the control system, thereby achieving more appropriate and efficient traction control as compared with the case where control is effected on the basis of the aforementioned reference speed Vr.

In FIG. 3, from the time $Q_1$ onward, the throttle opening degree command value T is decreased at a predetermined rate so that the engine output is decreased accordingly. However, in case the throttle opening degree command value T reaches the lower limit a for throttle opening degree command with respect to the current gear position, i.e., first speed gear position, then the throttle opening degree command value will be held at the position corresponding to the lower limit, thus preventing the throttle from being excessively opened.

At a time $Q_2$ when the notional vehicle speed EVv reaches a high peak where it changes from increase to decrease, throttle opening demand is provided so that the throttle opening degree command value begins increasing from the position corresponding to the aforementioned lower limit value with a predetermined rate, thus increasing the throttle opening degree.

At time $Q_3$, the transmission gear is shifted up from the first speed position to the second speed position, and throttle control routine such as shown in FIG. 4 is executed. More specifically, at step S1, the gear position assumed after the gear change is detected. At step S2, judgment is made as to whether the gear position assumed after the gear change is the first speed gear position. In this judgment, the result is "NO", and thus the process proceeds to step S4 where judgment is made as to whether that gear position is the second speed gear position. Since the result of this judgment is "YES", the throttle opening degree value T is decreased down to the lower limit value b for throttle opening degree command with respect to the second speed gear position at step S5.

What has been described just above concerns the case where the gear position assumed after the gear change is the second speed position, which occurs during the period from the time $Q_3$ to $Q_4$ in FIG. 3. It equally applies in the cases where any other gear position than the second speed one is assumed. More particularly, judgment is made as to whether the gear position is the first-speed one at step S2, as to whether it is the second-speed one at step S4, as to whether it is the third-speed one, and as to whether it is the fourth-speed one, as shown in FIG. 4. Depending on whether the result of the judgment at each step is "YES" or "NO", the process proceeds to the step S3, S5, S7, S9 or S10, and thus control is effected so that the throttle opening degree command value T is decreased down to an appropriate one of the lower limit values a through e.

At the time $Q_4$, the gear change is finished, and ordinary throttle control is restarted, so that the throttle opening degree command begins to increase with the predetermined rate from the position corresponding to the lower limit value b with respect to the second-speed gear position. In this way, the throttle opening degree is increased gradually.

The intended traction control is achieved by controlling the throttle as mentioned above.

Desirably, the lower limit value for throttle opening degree command with respect to a respective gear position is selected to be a minimum value in a range that a driving force enough to prevent engine stop, knocking or vehicle body vibration after the gear change can be obtained, i.e., such a position that the engine is prevented from being stopped without disengagement of the clutch.

As will be appreciated from the above discussion, according to the present invention, a lower limit for throttle opening degree command is set up with respect to each gear position of transmission, and when gear change is effected at the transmission, the throttle opening degree command value is decreased down to the lower limit corresponding to the gear position to be used next, thereby making it possible to prevent occurrence of such a tendency that the required driving force cannot be produced due to excessive closure of the throttle in the course of the throttle closing control. It is also possible to prevent a rapid increase in engine speed which would otherwise tend to occur during the gear change operation and thus sudden application of driving force to the driving wheel which would otherwise occur when the clutch is engaged. In this way, it is possible to prevent driving wheel slip.

In the foregoing embodiment, the reference speed Vr computed on the basis of the lefthand and righthand wheel speeds VdL and VdR is compared with the threshold value Vs only at the point of time when the control is started; and after that point of time, the notional vehicle speed EVv, instead of the reference speed Vr, is compared with the threshold value Vs to effect throttle control. With such an arrangment, more efficient traction control can be achieved by excluding slip, which tends to occur at the engine driving force transmission system, from the control system. However, the present invention is by no means limited thereto. It is also possible that throttle control may be effected by comparing the aforementioned reference speed with the threshold value even after the control is started.

While the present invention has been illustrated and described with respect to specific embodiments thereof, it is to be understood that the invention is by no means limited thereto but encompasses all modifications and changes which will become possible within the scope of the appended claims.

We claim:

1. A traction control system for a motor vehicle having a throttle, and a transmission; said system comprising: means for detecting driving wheel slip, means for changing a command value for opening the throttle depending on said driving wheel slip, means for controlling the degree of opening of the throttle in accordance with the throttle opening degree command value to restrain said driving wheel slip; means for detecting each gear position of the transmission; means for setting a lower limit value for the throttle opening degree command value with respect to each gear position of the transmission as detected; said means for setting a lower limit value including means for setting a different value for each respective gear position so that each value is different from any other value and corresponds to a different degree of opening for the throttle then for any other value; and means, for causing said throttle opening degree command value to be decreased down to the lower limit value upon a gear change of the transmission up or down.

2. A traction control system according to claim 1 wherein said means for setting a limit valve provides signals representing a lower limit value a for a throttle opening degree command value with respect to a first gear speed position of the transmission, a lower limit value b for a throttle opening degree command value with respect to a second gear speed position of the transmission, a lower limit value c for a throttle opening degree command value with respect to a third gear speed position of the transmission, a lower limit value d for a throttle opening degree command value with respect to a fourth gear speed position of the transmission and a lower limit value e for the throttle opening degree command with respect to a fifth gear speed position of the transmission where $a<b<c<d<e$.

3. A traction control system according to claim 1, further comprising:
   means for computing a reference speed Vr on the basis of lefthand and righthand driving wheel speeds VdL and VdR;
   means for setting up a control threshold value Vs by adding a predetermined value Vk to a computed vehicle speed Vv computed on the basis of lefthand and righthand non-driving wheel speeds VnL and VnR; and
   means arranged, when the motor vehicle starts running, for starting throttle closing control at a point of time when said reference speed Vr exceeds said control threshold value Vs.

4. A traction control system according to claim 3, wherein said reference speed Vv is the mean value of the lefthand and righthand driving wheel speeds VdL and VdR.

5. A traction control system according to claim 3, wherein said computed vehicle speed Vv is computed on the basis of the higher one of the lefthand and righthand non-driving wheel speeds VnL and VnR.

6. A traction control system according to claim 1, wherein a notional vehicle speed EVv is set up on the basis of engine speed, and gear position of transmission without taking into account of clutch slip; and said notional vehicle speed EVv is compared with said control threshold value Vs to effect throttle control.

7. A traction control system according to claim 1, wherein said transmission assumes first to fifth-speed gear positions; and lower limits a, b, c, d and e for throttle opening degree command are set up with respect to the first- to fifth-speed gear positions respectively in such a relationship that $a<b<c<d<e$.

* * * * *